(12) United States Patent
Koravadi

(10) Patent No.: US 11,563,919 B2
(45) Date of Patent: Jan. 24, 2023

(54) VEHICULAR VISION SYSTEM WITH DUAL PROCESSOR CONTROL

(71) Applicant: MAGNA ELECTRONICS INC., Auburn Hills, MI (US)

(72) Inventor: Krishna Koravadi, Rochester Hills, MI (US)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 95 days.

(21) Appl. No.: 17/302,139

(22) Filed: Apr. 26, 2021

(65) Prior Publication Data

US 2021/0250550 A1 Aug. 12, 2021

Related U.S. Application Data

(63) Continuation of application No. 16/283,927, filed on Feb. 25, 2019, now Pat. No. 10,992,908, which is a (Continued)

(51) Int. Cl.
*B60R 11/00* (2006.01)
*H04N 7/18* (2006.01)
(Continued)

(52) U.S. Cl.
CPC ............ *H04N 7/181* (2013.01); *B60R 11/04* (2013.01); *H04N 5/23216* (2013.01); *H04N 5/247* (2013.01); *B60R 2300/101* (2013.01); *B60R 2300/105* (2013.01); *B60R 2300/108* (2013.01); *B60R 2300/301* (2013.01); (Continued)

(58) Field of Classification Search
CPC .............. B60R 1/00; B60R 2300/105; B60R 2300/106; B60R 2300/107; B60R 2300/205; B60R 2300/207; B60R 2300/303; B60R 2300/305; B60R 2300/802; B60R 2300/804; B60R 2300/8053; B60R 2300/806;
(Continued)

(56) References Cited

U.S. PATENT DOCUMENTS 5,467,230 A 11/1995 Boddy et al.
5,497,306 A 3/1996 Pastrick
(Continued)

*Primary Examiner* — Frank F Huang
(74) *Attorney, Agent, or Firm* — Honigman LLP

(57) ABSTRACT

A vehicular vision system includes a forward viewing camera at a windshield of a vehicle and a plurality of color cameras, and includes a display device operable to display video images derived from image data captured by the color cameras. A processing unit includes a first processing chip that has an image processor for machine-vision processing of captured image data, and a second processing chip that receives vehicle data and receives image data captured by the color cameras. The first processing chip machine-vision processes image data captured by the cameras for object detection and classification of objects. The first processing chip controls operating parameters of the color cameras to enhance object detection based on machine-vision processing by the first processing chip of image data captured by the color cameras. The second processing chip controls operating parameters of the color cameras for display at the display device of video images.

23 Claims, 5 Drawing Sheets

Related U.S. Application Data continuation of application No. 15/613,376, filed on Jun. 5, 2017, now Pat. No. 10,218,940, which is a continuation of application No. 14/255,122, filed on Apr. 17, 2014, now Pat. No. 9,674,490.

(60) Provisional application No. 61/813,361, filed on Apr. 18, 2013.

(51) Int. Cl.
  *H04N 5/232* (2006.01)
  *H04N 5/247* (2006.01)
  *B60R 11/04* (2006.01)

(52) U.S. Cl.
  CPC ... *B60R 2300/607* (2013.01); *B60R 2300/806* (2013.01); *B60R 2300/808* (2013.01)

(58) Field of Classification Search
  CPC .... B60R 2300/8066; B60R 2300/8086; B60R 2300/103; H04N 7/18; H04N 7/181
  See application file for complete search history.

(56) References Cited

U.S. PATENT DOCUMENTS

| | | | |
|---|---|---|---|
| 5,550,677 A | 8/1996 | Schofield et al. | |
| 5,669,699 A | 9/1997 | Pastrick et al. | |
| 5,670,935 A | 9/1997 | Schofield et al. | |
| 5,949,331 A | 9/1999 | Schofield et al. | |
| 5,970,162 A | 10/1999 | Kawashima | |
| 6,067,031 A * | 5/2000 | Janky | G01S 5/0072 |
| | | | 340/904 |
| 6,118,480 A | 9/2000 | Anderson et al. | |
| 6,184,781 B1 | 2/2001 | Ramakesavan | |
| 6,690,268 B2 | 2/2004 | Schofield et al. | |
| 6,940,424 B2 * | 9/2005 | Philiben | G08G 5/04 |
| | | | 340/436 |
| 7,061,401 B2 | 6/2006 | Voos et al. | |
| 7,466,337 B2 | 12/2008 | Sawada et al. | |
| 7,587,260 B2 * | 9/2009 | Bruemmer | G06N 3/008 |
| | | | 318/587 |
| 7,596,281 B2 | 9/2009 | Irani et al. | |
| 7,640,107 B2 | 12/2009 | Shimizu et al. | |
| 7,640,108 B2 | 12/2009 | Shimizu et al. | |
| 7,675,563 B2 | 3/2010 | Nakajima et al. | |
| 7,957,858 B1 * | 6/2011 | Larson | G05D 1/0206 |
| | | | 340/436 |
| 7,963,448 B2 | 6/2011 | Testa | |
| 7,965,336 B2 | 6/2011 | Bingle et al. | |
| 8,040,421 B2 | 10/2011 | Suehiro | |
| 8,094,204 B2 | 1/2012 | Tsurumi | |
| 8,588,464 B2 * | 11/2013 | Albertson | G01C 21/00 |
| | | | 382/104 |
| 8,860,564 B2 * | 10/2014 | Rubin | G01C 21/3822 |
| | | | 340/436 |
| 9,264,672 B2 | 2/2016 | Lynam | |
| 9,674,490 B2 | 6/2017 | Koravadi | |
| 10,218,940 B2 | 2/2019 | Koravadi | |
| 10,992,908 B2 | 4/2021 | Koravadi | |
| 2003/0122930 A1 | 7/2003 | Schofield et al. | |
| 2003/0222793 A1 | 12/2003 | Tanaka et al. | |
| 2005/0012510 A1 | 1/2005 | Thibedeau et al. | |
| 2005/0125108 A1 | 6/2005 | Kwon et al. | |
| 2005/0231341 A1 | 10/2005 | Shimizu | |
| 2007/0241870 A1 | 10/2007 | Ohmura et al. | |
| 2008/0164985 A1 | 7/2008 | Iketani et al. | |
| 2008/0231703 A1 | 9/2008 | Nagata et al. | |
| 2010/0118146 A1 | 5/2010 | Schofield et al. | |
| 2010/0156616 A1 | 6/2010 | Aimura et al. | |
| 2010/0194886 A1 | 8/2010 | Asari et al. | |
| 2010/0220189 A1 | 9/2010 | Yanagi | |
| 2010/0245577 A1 | 9/2010 | Yamamoto et al. | |
| 2011/0234801 A1 | 9/2011 | Yamada et al. | |
| 2011/0285848 A1 | 11/2011 | Han et al. | |
| 2012/0062743 A1 | 3/2012 | Lynam et al. | |
| 2012/0069153 A1 | 3/2012 | Mochizuki et al. | |
| 2012/0069187 A1 | 3/2012 | Ozaki et al. | |
| 2012/0127312 A1 | 5/2012 | Nagamine et al. | |
| 2012/0154389 A1 | 6/2012 | Baur et al. | |
| 2012/0249796 A1 | 10/2012 | Kinoshita et al. | |
| 2012/0257058 A1 | 10/2012 | Kinoshita et al. | |
| 2012/0277957 A1 | 11/2012 | Inoue et al. | |
| 2013/0250114 A1 | 9/2013 | Lu | |
| 2014/0160284 A1 | 6/2014 | Achenbach et al. | |
| 2014/0333729 A1 | 11/2014 | Pflug | |
| 2014/0340510 A1 | 11/2014 | Ihlenburg et al. | |
| 2014/0376119 A1 | 12/2014 | Sobecki et al. | |
| 2015/0022664 A1 | 1/2015 | Pflug et al. | |
| 2015/0049193 A1 | 2/2015 | Gupta et al. | |

\* cited by examiner

VEHICULAR VISION SYSTEM WITH DUAL PROCESSOR CONTROL

CROSS REFERENCE TO RELATED APPLICATIONS

The present application is a continuation of U.S. patent application Ser. No. 16/283,927, filed Feb. 25, 2019, now U.S. Pat. No. 10,992,908, which is a continuation of U.S. patent application Ser. No. 15/613,376, filed Jun. 5, 2017, now U.S. Pat. No. 10,218,940, which is a continuation of U.S. patent application Ser. No. 14/255,122, filed Apr. 17, 2014, now U.S. Pat. No. 9,674,490, which claims the filing benefits of U.S. provisional application Ser. No. 61/813,361, filed Apr. 18, 2013, which is hereby incorporated herein by reference in its entirety.

FIELD OF THE INVENTION

The present invention relates generally to a vehicle vision system for a vehicle and, more particularly, to a vehicle vision system that utilizes one or more cameras at a vehicle.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties.

SUMMARY OF THE INVENTION

The present invention provides a vision system or imaging system for a vehicle that utilizes one or more cameras (preferably one or more CMOS cameras) to capture image data representative of images exterior of the vehicle, and provides the communication/data signals, including camera data or captured image data, that may be displayed at a display screen that is viewable by the driver of the vehicle, such as when the driver is backing up the vehicle, and that may be processed and, responsive to such image processing, the system may detect an object at or near the vehicle and in the path of travel of the vehicle, such as when the vehicle is backing up. The vision system may be operable to display a surround view or bird's eye view of the environment at or around or at least partially surrounding the subject or equipped vehicle, and the displayed image may include a displayed image representation of the subject vehicle. The present invention provides a cost effective combined surround view with an EYEQ3 architecture. The system may include a time multiplexed camera control.

The vision system of the present invention may provide a dynamically adjustable camera orientation. With such dynamically adjustable camera orientation (such as via one or more stepper motors at one or more of the exterior viewing cameras), the system may capture image data representative of the ground area immediately adjacent the portion of the vehicle at which the camera or cameras is/are disposed for use in a surround view display of the vehicle (such as during reverse travel of the vehicle or when the vehicle is traveling at a slow speed), and the system may capture image data representative of regions further away from the vehicle for use in, for example, a collision avoidance system or the like), such as when the vehicle is traveling at or above a threshold speed level. The system may adjust or control the fields of view of the cameras responsive to at least one of (i) actuation of a user input by a driver of the vehicle and (ii) a speed input indicative of the traveling speed of the vehicle.

These and other objects, advantages, purposes and features of the present invention will become apparent upon review of the following specification in conjunction with the drawings.

DESCRIPTION OF THE PREFERRED EMBODIMENTS

A vehicle vision system and/or driver assist system and/or object detection system and/or alert system operates to capture images exterior of the vehicle and may process the captured image data to display images and to detect objects at or near the vehicle and in the predicted path of the vehicle, such as to assist a driver of the vehicle in maneuvering the vehicle in a rearward direction. The vision system includes an image processor or image processing system that is operable to receive image data from one or more cameras and provide an output to a display device for displaying images representative of the captured image data. Optionally, the vision system may provide a top down or bird's eye or surround view display and may provide a displayed image that is representative of the subject vehicle, and optionally with the displayed image being customized to at least partially correspond to the actual subject vehicle.

Figure 1:
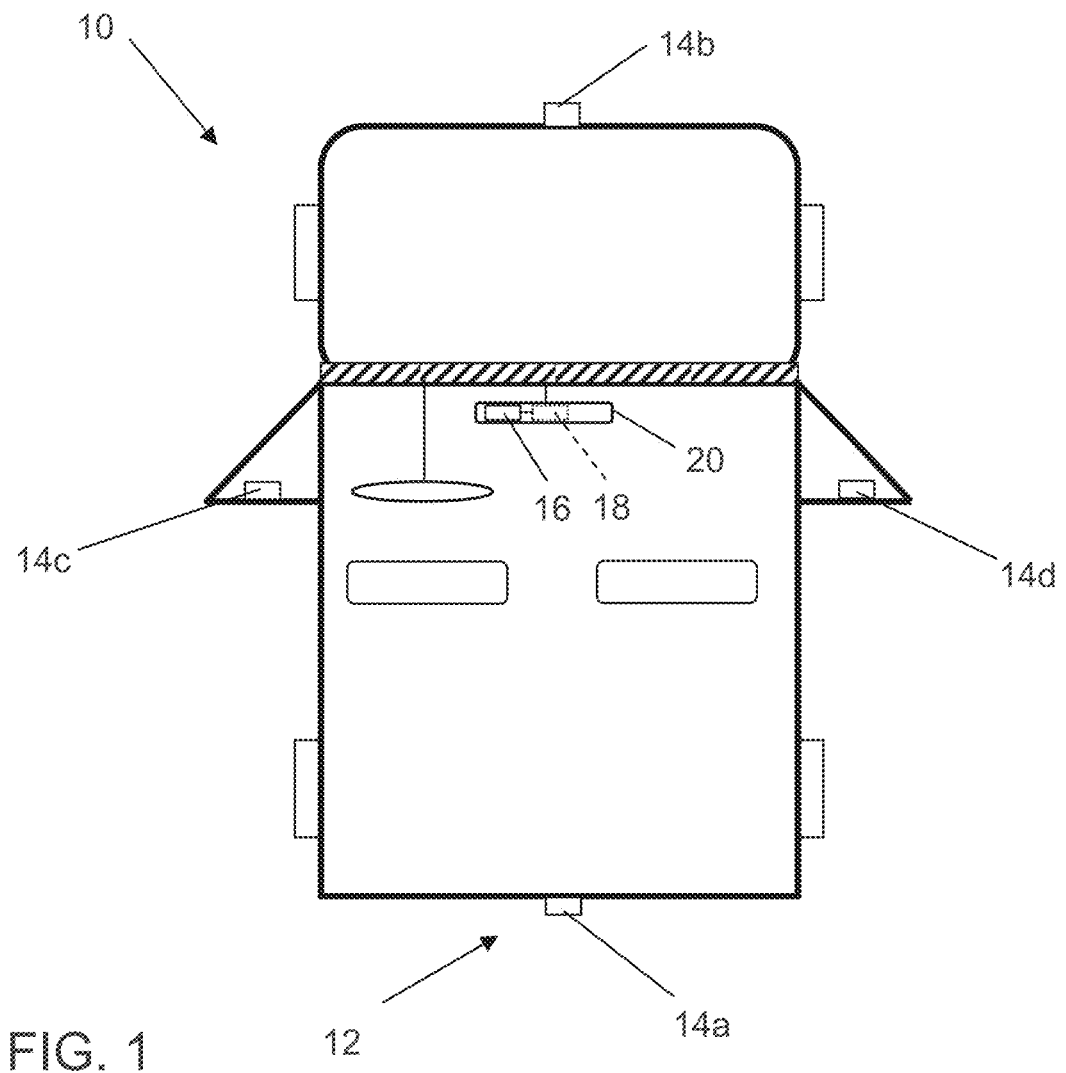
FIG. 1 is a plan view of a vehicle with a vision system that incorporates cameras in accordance with the present invention.

Referring now to the drawings and the illustrative embodiments depicted therein, a vehicle 10 includes an imaging system or vision system 12 that includes at least one exterior facing imaging sensor or camera, such as a rearward facing imaging sensor or camera 14a (and the system may optionally include multiple exterior facing imaging sensors or cameras, such as a forwardly facing camera 14b at the front (or at the windshield) of the vehicle, and a sidewardly/rearwardly facing camera 14c, 14b at respective sides of the vehicle), which captures images exterior of the vehicle, with the camera having a lens for focusing images at or onto an imaging array or imaging plane or imager of the camera (FIG. 1). The vision system 12 includes a control or electronic control unit (ECU) or processor 18 that is operable to process image data captured by the cameras and may provide displayed images at a display device 16 for viewing by the driver of the vehicle (although shown in FIG. 1 as being part of or incorporated in or at an interior rearview mirror assembly 20 of the vehicle, the control and/or the display device may be disposed elsewhere at or in the vehicle). The data transfer or signal communication from the camera to the ECU may comprise any suitable data or communication link, such as a vehicle network bus or the like of the equipped vehicle.

The present invention provides a cost effective combined surround view with EYEQ3 architecture. Optionally, the vision system of the present invention may provide time multiplexed camera control and/or dynamically adjustable camera orientation.

Figure 2:
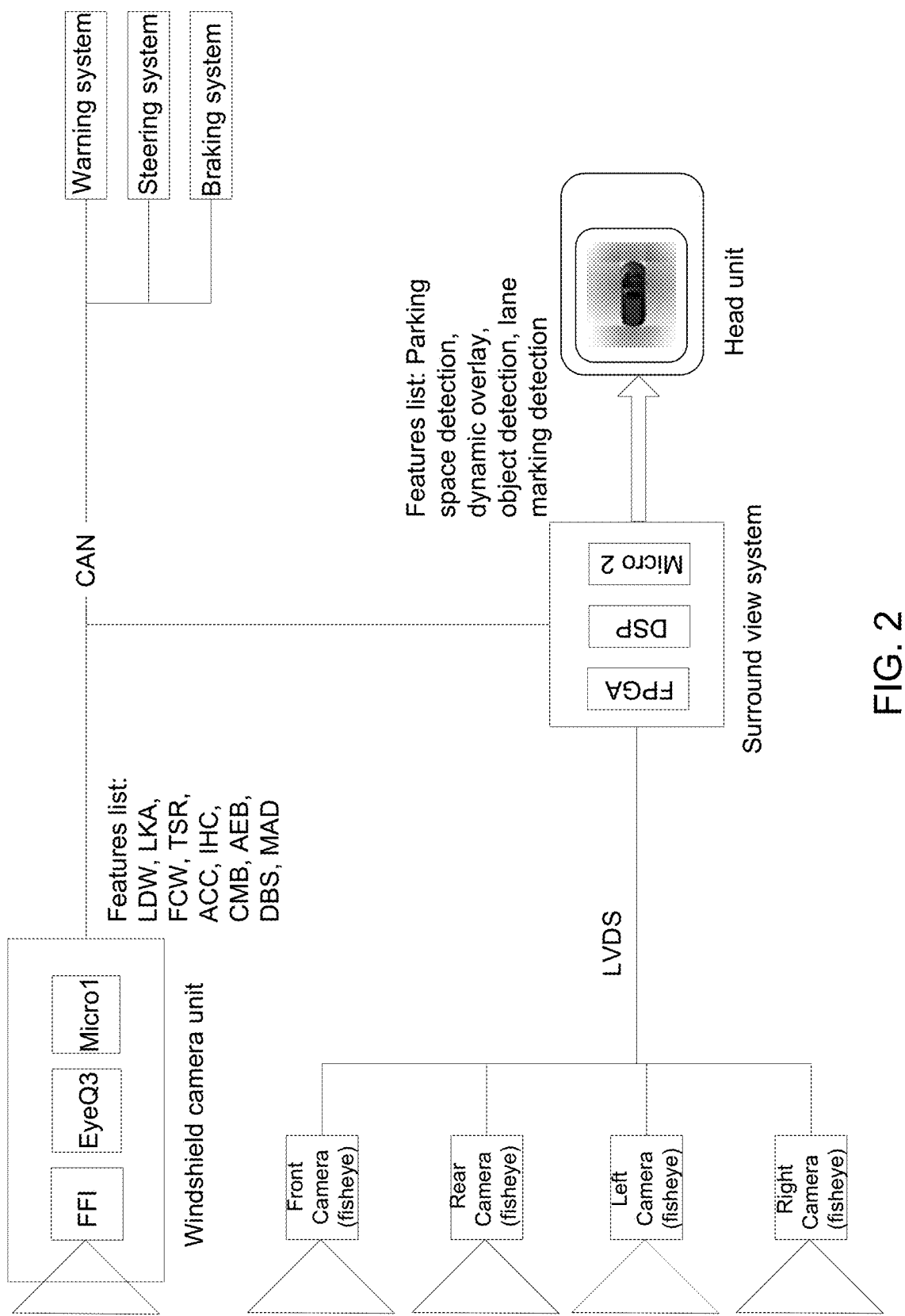
FIG. 2 is a schematic of a vision system using an image processor and two microcontrollers.

FIG. 2 shows a windshield camera unit of a surround view system, where the windshield unit has a forward facing imager (FFI) and an EYEQ3 image processor, along with micro controller for vehicle control algorithms (micro1). As also shown in FIG. 2, the surround view system has a field programmable gate array (FPGA), a digital signal processor (DSP) and microcontroller for vehicle control algorithms.

Figure 3:
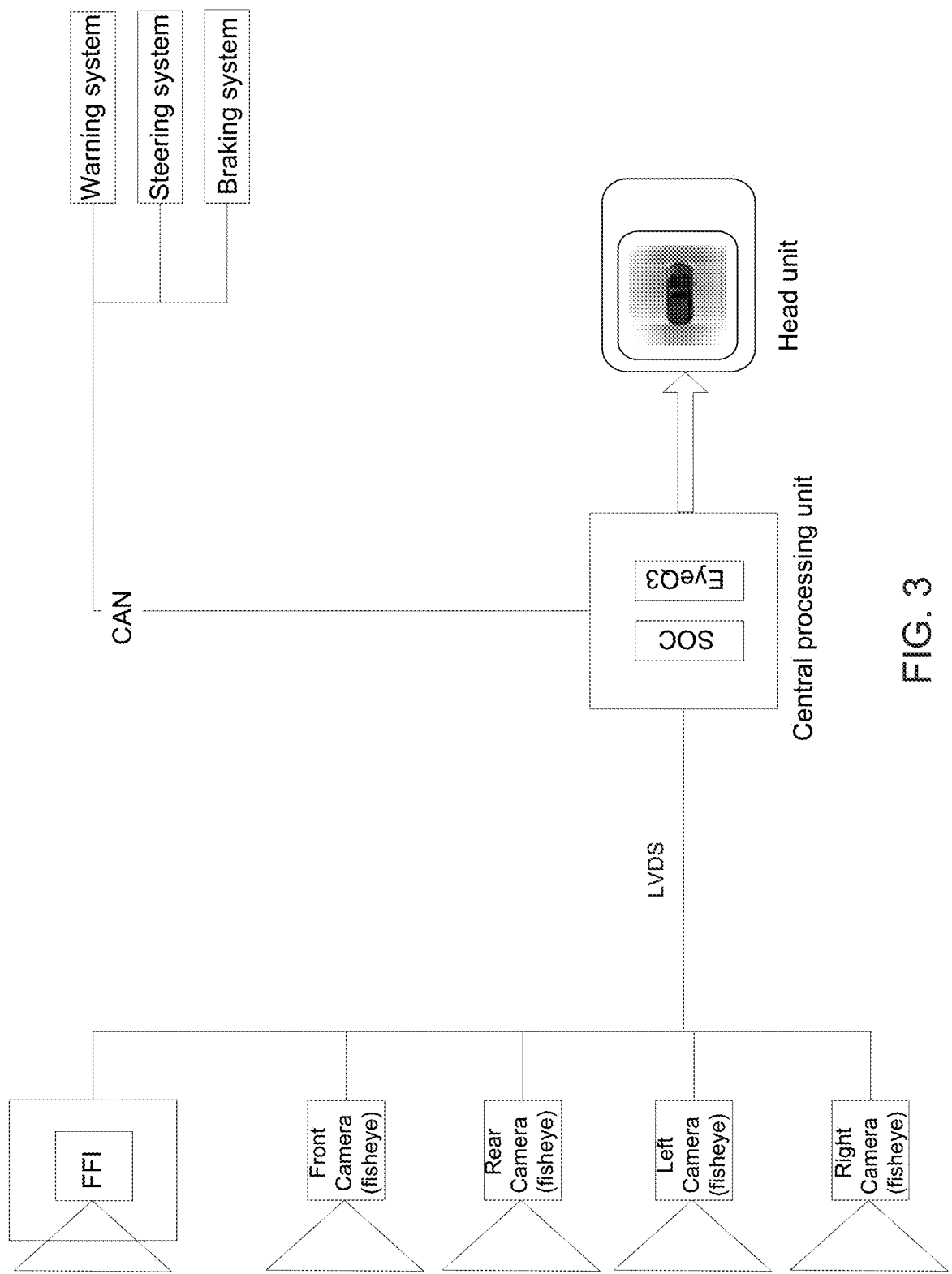
FIG. 3 is a schematic of a cost effective combined surround view with image processing architecture in accordance with the present invention.

As shown in FIG. 3, the present invention provides an integrated cost effective combined surround view and EYEQ3 architecture with a FFI (that may view through the windshield of the vehicle) and surround view cameras (disposed at respective front, rear and side portions of the vehicle) connected to a central processing unit that utilize the EYEQ3 image processor's object detection and classification capabilities for all of the cameras. This integrated platform could be used for following applications that needs simultaneous information from different/combination of cameras, along with applications that need only a forward facing imager (FFI), such as, for example, a lane departure warning (LDW) application, a lane keeping assist (LKA) application, a forward collision warning (FCW) application, a traffic sign recognition (TSR) application, an adaptive cruise control (ACC) application, an intelligent headlamp control (IHC) application and/or a collision mitigation by brake (CMB) application and/or the like.

| Feature | FFI (MV) (machine vision) | Front (SV) (surround vision) | Side (SV) (surround vision) | Rear (SV) (surround vision) |
|---|---|---|---|---|
| Blind Spot detection: Prevent accidents during lane change maneuvers. | | | x | x |
| Onramp assist: Predict whether car can accelerate enough to merge with existing traffic before end of onramp. | x | x | x | x |
| Low Speed CMB/pedestrians: Wider field of view to detect pedestrians that are relevant for impact while driving at very low speeds (1-2 m/s). | x | x | | |
| Low Speed CMB/bicycles: Wider field of view to detect crossing bicycles that are relevant for impact while driving at low speeds. Example: Vehicle speed 10 m/s, detecting bicycle traveling 10 m/s at 45 degree angle. | x | x | | |
| Door opening protection: Prevent door opening when an obstacle is in collision path. | | | x | x |
| Prevent running red lights. Alert, possibly braking. | x | | | |
| Alert go when traffic light change to green. | x | x | | |
| Adaptive Cruise Control (ACC) automatic go in stop and go ACC (in city). | x | x | | |
| Traffic Jam assist - Lateral and longitudinal control in traffic jam and/or lane splitting scenarios (low speed, controlled access road). | x | x | x | x |
| Enhanced Automatic Emergency Braking (AEB) based on rear traffic: for example, err on side of not-braking or delayed braking if rear traffic is present. | x | | | x |
| Better lane detection at low sun; improved availability of lane information e.g. for Lane Keep Assist (LKA) and Lane Departure Warning (LDW). | x | | | x |
| Full autonomous driving including: autonomous lane change to overtake slower cars; construction area driving; lane merges. | x | x | x | x |
| Autonomous pull-over maneuver in case of incapacitated/unresponsive driver. | x | x | x | x |
| Automatic trailer hookup (guides car to trailer). | | | | x |
| Trailer backup (automatically steer car based on driver selected trajectory). | | | | x |
| Automatic parking (parallel, perpendicular) with driver in control of longitudinal movement. | x | x | x | x |
| Autonomous/remote controlled parking (parallel, perpendicular). | x | x | x | x |
| Traffic Sign Recognition (TSR) extension to height limitation signs. | x | | | |
| Parking path height detection - based on identified need to prevent car from running into low-hanging objects during automatic (remote controlled) parking. | x | | | x |
| AEB during backup maneuver. | | | | x |
| Traffic Sign Recognition (TSR) to set ACC speed, speed limiter. | x | | | |
| Child-presence detection: Warn if child is present in proximity of vehicle, even if not in path and not moving. | | x | x | x |
| Ball detection. | x | x | | |
| Pedestrian impact detection to activate active pedpro system (open: use camera to replace existing sensor or in addition to another impact sensor). | x | x | | |
| Road friction estimation (snow, gravel, ice, ...) to adjust AEB thresholds and/or curve speed warning. | x | | | |
| Pothole depth and speed | x | | | |

-continued

| Feature | FFI (MV) (machine vision) | Front (SV) (surround vision) | Side (SV) (surround vision) | Rear (SV) (surround vision) |
|---|---|---|---|---|
| bump height estimation for active suspension control. | | | | |
| Read license plate of preceding/following vehicle, e.g. for amber alert notifications. | x | x | | x |
| Curb detection/warning if curb is too high to drive onto. Prevent damage to rims. Apply 3D information to parking situations. | | x | x | x |
| Perspective correction for more accurate bird's eye view display (more realistic image). | | x | x | x |
| ACC: Don't accelerate while being overtaken. | x | | x | X |
| Lighting control: Adjust lighting decision based on knowledge or other car overtaking of driving parallel. | x | | x | X |

Figure 4:
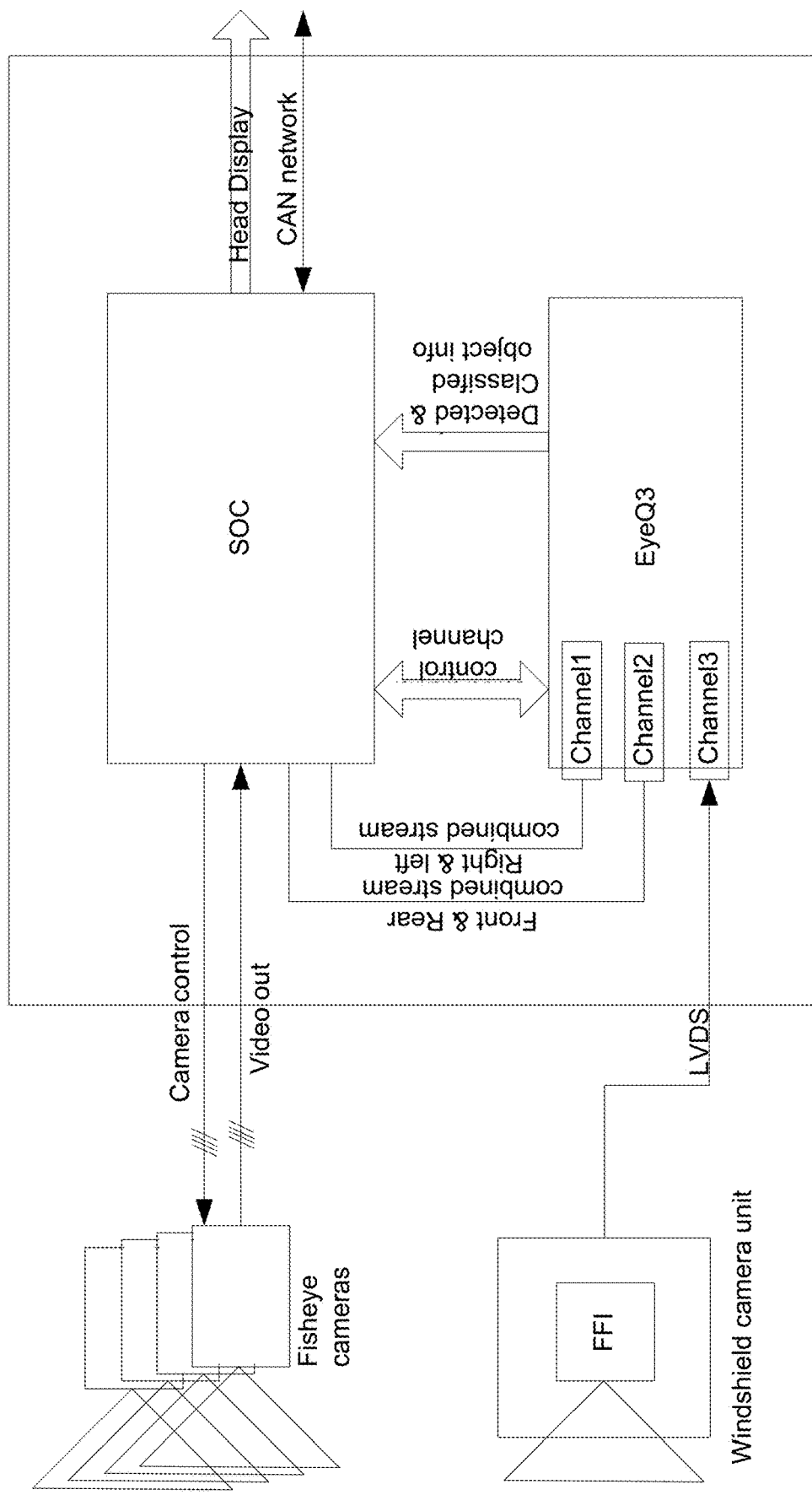
FIG. 4 is a schematic of a time multiplexed camera control in accordance with the present invention.

The time multiplexed camera control aspect of the present invention is shown in FIG. 4, which shows the central processing unit architecture where the EYEQ3 processor is used as an object detection and classification platform for all of the vehicle vision system cameras. The EYEQ3 processor may be fed with a FFI video stream to one input channel, while the right and left combined video stream is fed to a second input channel and the front and rear video stream is fed into a third input channel. The system controller or system on a chip or SOC (an FPGA with micro controller core(s) on a single chip) acts as the master controller of the camera control (gain and exposure). The SOC will decide on when to give control of the cameras to the EYEQ3 processor or chip and when it needs to control the cameras for features that may need to be displayed on the head display unit. The camera control may be time multiplexed with the EYEQ3 processor and algorithms running in the SOC, such as applications that use the head unit to display images/video stream and/or that need object detection simultaneously from the EYEQ3 processor or chip.

Figure 5:
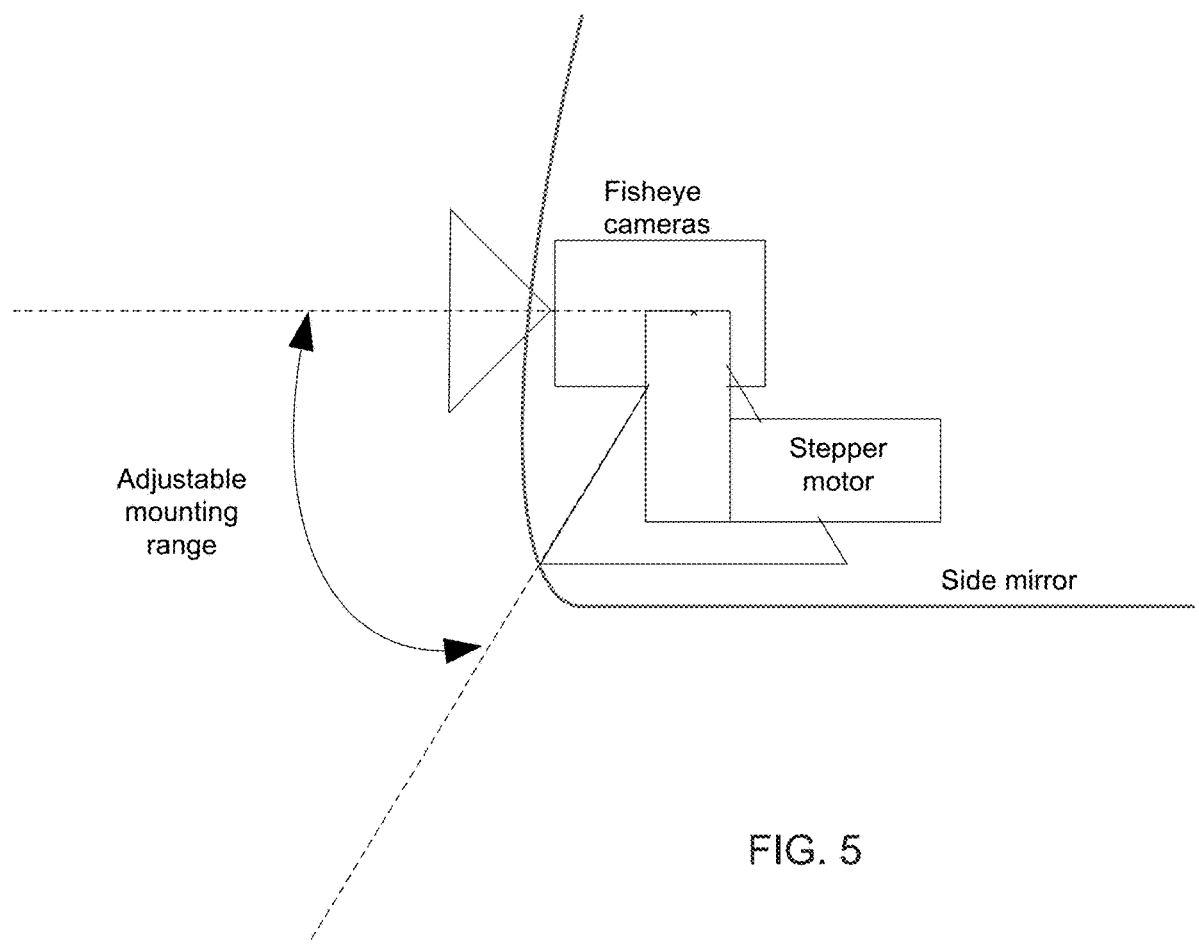
FIG. 5 is a schematic of a dynamically adjustable camera orientation in accordance with the present invention.

The dynamically adjustable camera orientation aspect of the present invention is shown in FIG. 5, where the camera mounting position/orientation (especially for the side cameras) is very important to get better information on the surrounding area sideward and/or rearward of the vehicle, especially for the applications such as autonomous driving, lane change assist and traffic jam assist, blind spot detection and/or the like. The side cameras may also be used for the surround view system (360 degree view), which needs the cameras to be mounted pointing downward so as to capture image data representative of the ground area sideward of the vehicle.

With the proposed stepper motor controlled (via a microprocessor) dynamic camera mount position/orientation (and thus the external field of view of the camera) adjustment mechanism (shown in FIG. 5), the camera position/orientation may be dynamically adjusted by the central processing unit, depending on the application need (such as a predefined set of positions and not any random positions, important for the camera calibration). Although shown as one camera in FIG. 5, one or more or all of the cameras at the front, rear and sides of the vehicle (for the surround view system) may have a respective stepper motor and mount configuration disposed thereat or integrated therein, to provide the dynamic adjustment of each of the surround view cameras.

The stepper motors are operable (via microprocessor control and responsive to at least one of a user input and a speed input indicative of the forward speed of travel of the vehicle) to adjust the vertical field of view of the respective camera or cameras. Thus, when the vehicle is traveling rearward or is traveling forward and at a speed below a threshold level, the stepper motors may adjust the sideward viewing cameras and/or the forward viewing and/or rearward viewing cameras to be directed generally downward so as to have their fields of view encompass a ground area immediately adjacent the portions of the vehicle at which the cameras are disposed. When the vehicle is traveling forward and at a speed at or above a threshold level, the stepper motors may adjust the fields of view of the cameras upward so as to direct the fields of view to encompass an area or region further from the portions of the vehicle at which the cameras are disposed. The system thus may capture images for use in a surround vision display when the vehicle is traveling in reverse or at a slow forward speed, and may capture images for use in a collision avoidance system when the vehicle is traveling at a greater speed in a forward direction.

Optionally, the system may include a stepper motor that may be used to adjust the horizontal fields of view of the cameras. Optionally, a pair of stepper motors may be used to adjust the field of view of the camera or cameras along orthogonal axes (such as horizontal and vertical or such as any other generally orthogonal axes), whereby the pair of stepper motors may be operable to adjust the fields of view of the cameras to encompass a desired region during various operating conditions of the vehicle (such as during reverse travel and/or during slow forward travel and/or during faster forward travel of the vehicle). The vision system thus may automatically and dynamically adjust the fields of view of the cameras or imagers responsive to one or more inputs (such as a user input that is accessible by and actuatable by the driver of the vehicle and/or such as a speed input indicative of a speed of travel of the vehicle and/or such as a directional input indicative of a travel direction of the vehicle), such that the cameras capture image data representative of a desired or appropriate region at or near or outward from the front, rear and/or side portions of the vehicle, depending on the particular driving condition that the vehicle is undergoing at that time.

For a surround vision system that is typically used by the driver during low speed maneuvering, such as when parking the vehicle or backing up the vehicle, it is desirable that the fields of view of the cameras include the ground area immediately adjacent the vehicle. For example, for a side mounted camera (such as at an exterior rearview mirror of the vehicle), when used for surround vision functionality, it is desirable that the fields of view of the side cameras encompass the ground area immediately adjacent the respective side of the vehicle that the exterior mirror mounted camera is located. Likewise, for front and a rear mounted cameras, when used for surround vision functionality, it is desirable that their respective fields of view encompass the ground area immediately in front of or behind the equipped vehicle. However, when the vehicle is traveling at speeds along a road, such as on a highway or the like, it is desirable to have the fields of views of such cameras encompass areas or regions away from the ground area immediately adjacent the vehicle forward, such as rearward of the vehicle (for a rear mounted camera) or forward of the vehicle (for a front mounted camera) or sideward of the vehicle (for side mounted cameras) to detect vehicles and objects at greater distances from the vehicle and approaching the vehicle. In such situations, image data captured by the cameras may be processed by an image processor for use in a collision avoidance system or traffic sign detection system or other driver assistance systems that utilize image data representative of scenes occurring at greater distances from the current location of the vehicle.

Thus, when not being used for surround vision purposes, it is desirable that the aim of the respective cameras move from being generally downwardly to be directed less downwardly and more outwardly away from the side/front/rear of the vehicle at which the camera is mounted. Such an adjustment is achieved via the stepper motor and system of the present invention. This adjustment may be done manually by the driver (such as via the driver actuating a user input or toggle that adjusts the orientation of one or more of the cameras) or may be automatically performed based on or responsive to the likes of the speed of the vehicle being at or greater than a threshold level, such as greater than about five miles per hour, or greater than about ten mph or greater than about fifteen mph or any other threshold level, depending on the particular application of the system and cameras. Optionally, the degree of outward or upward adjustment of the cameras' fields of views may increase as the vehicle speed increases. For example, the camera may be adjusted a first amount or pivoted or angled or raised a first angle responsive to the vehicle reaching a first threshold speed (such as, for example, about five mph or thereabouts) and then may be adjusted a second amount or pivoted or angled or raised a second angle responsive to the vehicle reaching a second threshold speed (such as, for example, about fifteen mph or twenty-five mph or thereabouts). The present invention thus may utilize cameras with a wide or lateral field of view and a narrower or less high field of view, as the vertical range of the field of view may be adjusted via operation of the vision system and stepper motor system of the present invention.

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in International Publication Nos. WO 2013/081984 and/or WO 2013/081985, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an EYEQ2 or EYEQ3 image processing chip available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ladar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. Preferably, the imaging array has at least 300,000 photosensor elements or pixels, more preferably at least 500,000 photosensor elements or pixels and more preferably at least 1 million photosensor elements or pixels. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or International Publication Nos. WO 2011/028686; WO 2010/099416; WO 2012/061567; WO 2012/068331; WO 2012/075250; WO 2012/103193; WO 2012/0116043; WO 2012/0145313; WO 2012/0145501; WO 2012/145818; WO 2012/145822; WO 2012/158167; WO 2012/075250; WO 2012/0116043; WO 2012/0145501; WO 2012/154919; WO 2013/019707; WO 2013/016409; WO 2013/019795; WO 2013/067083; WO 2013/070539; WO 2013/043661; WO 2013/048994; WO 2013/063014; WO 2013/081984; WO 2013/081985; WO 2013/074604; WO 2013/086249; WO 2013/103548; WO 2013/109869; WO 2013/123161; WO 2013/126715; WO 2013/043661 and/or WO 2013/158592, and/or U.S. patent applications, Ser. No. 14/248,602, filed Apr. 9, 2014, now U.S. Pat. No. 9,327,693; Ser. No. 14/242,038, filed Apr. 1, 2014, now U.S. Pat. No. 9,487,159; Ser. No. 14/229,061, filed Mar. 28, 2014, and published Oct. 2, 2014 as U.S. Publication No. US-2014-0293042; Ser. No. 14/343,937, filed Mar. 10, 2014, now U.S. Pat. No. 9,681,062; Ser. No. 14/343,936, filed Mar. 10, 2014, and published Aug. 7, 2014 as U.S. Publication No. US-2014-0218535; Ser. No. 14/195,135, filed Mar. 3, 2014, and published Sep. 4, 2014 as U.S. Publication No. US-2014-0247354; Ser. No. 14/195,136, filed Mar. 3, 2014, and published Sep. 4, 2014 as U.S. Publication No. US-2014-0247355; Ser. No. 14/191,512, filed Feb. 27, 2014, and published Sep. 4, 2014 as U.S. Publication No. US-2014-0247352; Ser. No. 14/183,613, filed Feb. 19, 2014, now U.S. Pat. No. 9,445,057; Ser. No. 14/169,329, filed Jan. 31, 2014, and published Aug. 7, 2014 as U.S. Publication No. US-2014-0218529; Ser. No. 14/169,328, filed Jan. 31, 2014, now U.S. Pat. No. 9,092,986; Ser. No. 14/163,325, filed Jan. 24, 2014, and published Jul. 31, 2014 as U.S. Publication No. US-2014-0211009; Ser. No. 14/159,772, filed Jan. 21, 2014, now U.S. Pat. No. 9,068,390; Ser. No. 14/107,624, filed Dec. 16, 2013, now U.S. Pat. No. 9,140,789; Ser. No. 14/102,981, filed Dec. 11, 2013, now U.S. Pat. No. 9,558,409; Ser. No. 14/102,980, filed Dec. 11, 2013, and published Jun. 19, 2014 as U.S. Publication No. US-2014-0168437; Ser. No. 14/098,817, filed Dec. 6, 2013, and published Jun. 19, 2014 as U.S. Publication No. US-2014-0168415; Ser. No. 14/097,581, filed Dec. 5, 2013, now U.S. Pat. No. 9,481,301; Ser. No. 14/093,981, filed Dec. 2, 2013, now U.S. Pat. No. 8,917,169; Ser. No. 14/093,980, filed Dec. 2, 2013, and published Jun. 5, 2014 as U.S. Publication No. US-2014-0152825; Ser. No. 14/082,573, filed Nov. 18, 2013, and published May 22, 2014 as U.S. Publication No. US-2014-0139676; Ser. No. 14/082,574, filed Nov. 18, 2013, now U.S. Pat. No. 9,307,640; Ser. No. 14/082,575, filed Nov. 18, 2013, now U.S. Pat. No. 9,090,234; Ser. No. 14/082,577, filed Nov. 18, 2013, now U.S. Pat. No. 8,818,042; Ser. No. 14/071,086, filed Nov. 4, 2013, now U.S. Pat. No. 8,886,401; Ser. No. 14/076,524, filed Nov. 11, 2013, now U.S. Pat. No. 9,077,962; Ser. No. 14/052,945, filed Oct. 14, 2013, and published Apr. 17, 2014 as U.S. Publication No. US-2014-0104426; Ser. No. 14/046,174, filed Oct. 4, 2013, and published Apr. 10, 2014 as U.S. Publication No. US-2014-0098229; Ser. No. 14/016,790, filed Oct. 3, 2013, and published Mar. 6, 2014 as U.S. Publication No. US-2014-0067206; Ser. No. 14/036,723, filed Sep. 25, 2013, now U.S. Pat. No. 9,446,713; Ser. No. 14/016,790, filed Sep. 3, 2013, and published Mar. 6, 2014 as U.S. Publication No. US-2014-0067206; Ser. No. 14/001,272, filed Aug. 23, 2013, now U.S. Pat. No. 9,233,641; Ser. No. 13/970,868, filed Aug. 20, 2013, now U.S. Pat. No. 9,365,162; Ser. No. 13/964,134, filed Aug. 12, 2013, now U.S. Pat. No. 9,340,227; Ser. No. 13/942,758, filed Jul. 16, 2013, and published Jan. 23, 2014 as U.S. Publication No. US-2014-0025240; Ser. No. 13/942,753, filed Jul. 16, 2013, and published Jan. 30, 2014 as U.S. Publication No. US-2014-0028852; Ser. No. 13/927,680, filed Jun. 26, 2013, and published Jan. 2, 2014 as U.S. Publication No. US-2014-0005907; Ser. No. 13/916,051, filed Jun. 12, 2013, now U.S. Pat. No. 9,077,098; Ser. No. 13/894,870, filed May 15, 2013, and published Nov. 28, 2013 as U.S. Publication No. 2013-0314503; Ser. No. 13/887,724, filed May 6, 2013, now U.S. Pat. No. 9,670,895; Ser. No. 13/852,190, filed Mar. 28, 2013, and published on Aug. 29, 2013 as U.S. Publication No. US-2013-0222593; Ser. No. 13/851,378, filed Mar. 27, 2013, now U.S. Pat. No. 9,319,637; Ser. No. 13/848,796, filed Mar. 22, 2012, and published Oct. 24, 2013 as U.S. Publication No. US-2013-0278769; Ser. No. 13/847,815, filed Mar. 20, 2013, and published Oct. 31, 2013 as U.S. Publication No. 2013-0286193; Ser. No. 13/800,697, filed Mar. 13, 2013, and published Oct. 3, 2013 as U.S. Publication No. 2013-0258077; Ser. No. 13/785,099, filed Mar. 5, 2013, now U.S. Pat. No. 9,565,342; Ser. No. 13/779,881, filed Feb. 28, 2013, now U.S. Pat. No. 8,694,224; Ser. No. 13/774,317, filed Feb. 22, 2013, now U.S. Pat. No. 9,269,263; Ser. No. 13/774,315, filed Feb. 22, 2013, and published Aug. 22, 2013 as U.S. Publication No. US-2013-0215271; Ser. No. 13/681,963, filed Nov. 20, 2012, now U.S. Pat. No. 9,264,673; Ser. No. 13/660,306, filed Oct. 25, 2012, now U.S. Pat. No. 9,146,898; Ser. No. 13/653,577, filed Oct. 17, 2012, now U.S. Pat. No. 9,174,574; and/or Ser. No. 13/534,657, filed Jun. 27, 2012, and published Jan. 3, 2013 as U.S. Publication No. US-2013-0002873, and/or U.S. provisional applications, Ser. No. 61/977,941, filed Apr. 10, 2014; Ser. No. 61/977,940. filed Apr. 10, 2014; Ser. No. 61/977,929, filed Apr. 10, 2014; Ser. No. 61/977,928, filed Apr. 10, 2014; Ser. No. 61/973,922, filed Apr. 2, 2014; Ser. No. 61/972,708, filed Mar. 31, 2014; Ser. No. 61/972,707, filed Mar. 31, 2014; Ser. No. 61/969,474, filed Mar. 24, 2014; Ser. No. 61/955,831, filed Mar. 20, 2014; Ser. No. 61/953,970, filed Mar. 17, 2014; Ser. No. 61/952,335, filed Mar. 13, 2014; Ser. No. 61/952,334, filed Mar. 13, 2014; Ser. No. 61/950,261, filed Mar. 10, 2014; Ser. No. 61/950,261, filed Mar. 10, 2014; Ser. No. 61/947,638, filed Mar. 4, 2014; Ser. No. 61/947,053, filed Mar. 3, 2014; Ser. No. 61/942,568, filed Feb. 19, 2014; Ser. No. 61/935,485, filed Feb. 4, 2014; Ser. No. 61/935,057, filed Feb. 3, 2014; Ser. No. 61/935,056, filed Feb. 3, 2014; Ser. No. 61/935,055, filed Feb. 3, 2014; Ser. 61/931,811, filed Jan. 27, 2014; Ser. No. 61/919,129, filed Dec. 20, 2013; Ser. No. 61/919,130, filed Dec. 20, 2013; Ser. No. 61/919,131, filed Dec. 20, 2013; Ser. No. 61/919,147, filed Dec. 20, 2013; Ser. No. 61/919,138, filed Dec. 20, 2013, Ser. No. 61/919,133, filed Dec. 20, 2013; Ser. No. 61/918,290, filed Dec. 19, 2013; Ser. No. 61/915,218, filed Dec. 12, 2013; Ser. No. 61/912,146, filed Dec. 5, 2013; Ser. No. 61/911,666, filed Dec. 4, 2013; Ser. No. 61/911,665, filed Dec. 4, 2013; Ser. No. 61/905,461, filed Nov. 18, 2013; Ser. No. 61/905,462, filed Nov. 18, 2013; Ser. No. 61/901,127, filed Nov. 7, 2013; Ser. No. 61/895,610, filed Oct. 25, 2013; Ser. No. 61/895,609, filed Oct. 25, 2013; Ser. No. 61/879,837, filed Sep. 19, 2013; Ser. No. 61/879,835, filed Sep. 19, 2013; Ser. No. 61/878,877, filed Sep. 17, 2013; Ser. No. 61/875,351, filed Sep. 9, 2013; Ser. No. 61/869,195, filed. Aug. 23, 2013; Ser. No. 61/864,835, filed Aug. 12, 2013; Ser. No. 61/864,836, filed Aug. 12, 2013; Ser. No. 61/864,837, filed Aug. 12, 2013; Ser. No. 61/864,838, filed Aug. 12, 2013; Ser. No. 61/856,843, filed Jul. 22, 2013, Ser. No. 61/845,061, filed Jul. 11, 2013; Ser. No. 61/844,630, filed Jul. 10, 2013; Ser. No. 61/844,173, filed Jul. 9, 2013; Ser. No. 61/844,171, filed Jul. 9, 2013; Ser. No. 61/842,644, filed Jul. 3, 2013; Ser. No. 61/840,542, filed Jun. 28, 2013; Ser. No. 61/838,619, filed Jun. 24, 2013; Ser. No. 61/838,621, filed Jun. 24, 2013; Ser. No. 61/837,955, filed Jun. 21, 2013; Ser. No. 61/836,900, filed Jun. 19, 2013; Ser. No. 61/836,380, filed Jun. 18, 2013; Ser. No. 61/833,080, filed Jun. 10, 2013; Ser. No. 61/830,375, filed Jun. 3, 2013; Ser. No. 61/830,377, filed Jun. 3, 2013; Ser. No. 61/825,752, filed May 21, 2013; Ser. No. 61/825,753, filed May 21, 2013; Ser. No. 61/823,648, filed May 15, 2013; Ser. No. 61/823,644, filed May 15, 2013; Ser. No. 61/821,922, filed May 10, 2013; Ser. No. 61/819,835, filed May 6, 2013; Ser. No. 61/819,033, filed May 3, 2013; Ser. No. 61/816,956, filed Apr. 29, 2013; Ser. No. 61/815,044, filed Apr. 23, 2013; and/or Ser. No. 61/814,533, filed Apr. 22, 2013, which are all hereby incorporated herein by reference in their entireties. The system may communicate with other communication systems via any suitable means, such as by utilizing aspects of the systems described in International Publication Nos. WO 2010/144900; WO 2013/043661 and/or WO 2013/081985, and/or U.S. patent application Ser. No. 13/202,005, filed Aug. 17, 2011, now U.S. Pat. No. 9,126,525, which are hereby incorporated herein by reference in their entireties.

The imaging device and control and image processor and any associated illumination source, if applicable, may comprise any suitable components, and may utilize aspects of the cameras and vision systems described in U.S. Pat. Nos. 5,550,677; 5,877,897; 6,498,620; 5,670,935; 5,796,094; 6,396,397; 6,806,452; 6,690,268; 7,005,974; 7,937,667; 7,123,168; 7,004,606; 6,946,978; 7,038,577; 6,353,392; 6,320,176; 6,313,454 and 6,824,281, and/or International Publication Nos. WO 2010/099416; WO 2011/028686 and/or WO 2013/016409, and/or U.S. Pat. Publication No. US 2010-0020170, and/or U.S. patent application Ser. No.

13/534,657, filed Jun. 27, 2012, and published Jan. 3, 2013 as U.S. Publication No. US-2013-0002873, which are all hereby incorporated herein by reference in their entireties. The camera or cameras may comprise any suitable cameras or imaging sensors or camera modules, and may utilize aspects of the cameras or sensors described in U.S. Publication No. US-2009-0244361 and/or U.S. patent application Ser. No. 13/260,400, filed Sep. 26, 2011, now U.S. Pat. No. 8,542,451, and/or U.S. Pat. Nos. 7,965,336 and/or 7,480,149, which are hereby incorporated herein by reference in their entireties. The imaging array sensor may comprise any suitable sensor, and may utilize various imaging sensors or imaging array sensors or cameras or the like, such as a CMOS imaging array sensor, a CCD sensor or other sensors or the like, such as the types described in U.S. Pat. Nos. 5,550,677; 5,670,935; 5,760,962; 5,715,093; 5,877,897; 6,922,292; 6,757,109; 6,717,610; 6,590,719; 6,201,642; 6,498,620; 5,796,094; 6,097,023; 6,320,176; 6,559,435; 6,831,261; 6,806,452; 6,396,397; 6,822,563; 6,946,978; 7,339,149; 7,038,577; 7,004,606; 7,720,580 and/or 7,965,336, and/or International Publication Nos. WO 2009/036176 and/or WO 2009/046268, which are all hereby incorporated herein by reference in their entireties.

The camera module and circuit chip or board and imaging sensor may be implemented and operated in connection with various vehicular vision-based systems, and/or may be operable utilizing the principles of such other vehicular systems, such as a vehicle headlamp control system, such as the type disclosed in U.S. Pat. Nos. 5,796,094; 6,097,023; 6,320,176; 6,559,435; 6,831,261; 7,004,606; 7,339,149 and/or 7,526,103, which are all hereby incorporated herein by reference in their entireties, a rain sensor, such as the types disclosed in commonly assigned U.S. Pat. Nos. 6,353,392; 6,313,454; 6,320,176 and/or 7,480,149, which are hereby incorporated herein by reference in their entireties, a vehicle vision system, such as a forwardly, sidewardly or rearwardly directed vehicle vision system utilizing principles disclosed in U.S. Pat. Nos. 5,550,677; 5,670,935; 5,760,962; 5,877,897; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978 and/or 7,859,565, which are all hereby incorporated herein by reference in their entireties, a trailer hitching aid or tow check system, such as the type disclosed in U.S. Pat. No. 7,005,974, which is hereby incorporated herein by reference in its entirety, a reverse or sideward imaging system, such as for a lane change assistance system or lane departure warning system or for a blind spot or object detection system, such as imaging or detection systems of the types disclosed in U.S. Pat. Nos. 7,881,496; 7,720,580; 7,038,577; 5,929,786 and/or 5,786,772, and/or U.S. provisional applications, Ser. No. 60/628,709, filed Nov. 17, 2004; Ser. No. 60/614,644, filed Sep. 30, 2004; Ser. No. 60/618,686, filed Oct. 14, 2004; Ser. No. 60/638,687, filed Dec. 23, 2004, which are hereby incorporated herein by reference in their entireties, a video device for internal cabin surveillance and/or video telephone function, such as disclosed in U.S. Pat. Nos. 5,760,962; 5,877,897; 6,690,268 and/or 7,370,983, and/or U.S. Publication No. US-2006-0050018, which are hereby incorporated herein by reference in their entireties, a traffic sign recognition system, a system for determining a distance to a leading or trailing vehicle or object, such as a system utilizing the principles disclosed in U.S. Pat. Nos. 6,396,397 and/or 7,123,168, which are hereby incorporated herein by reference in their entireties, and/or the like.

Optionally, the circuit board or chip may include circuitry for the imaging array sensor and or other electronic accessories or features, such as by utilizing compass-on-a-chip or EC driver-on-a-chip technology and aspects such as described in U.S. Pat. No. 7,255,451 and/or U.S. Pat. No. 7,480,149; and/or U.S. Publication No. US-2006-0061008 and/or U.S. patent application Ser. No. 12/578,732, filed Oct. 14, 2009, now U.S. Pat. No. 9,487,144, which are hereby incorporated herein by reference in their entireties.

Optionally, the vision system may include a display for displaying images captured by one or more of the imaging sensors for viewing by the driver of the vehicle while the driver is normally operating the vehicle. Optionally, for example, the vision system may include a video display device disposed at or in the interior rearview mirror assembly of the vehicle, such as by utilizing aspects of the video mirror display systems described in U.S. Pat. No. 6,690,268 and/or U.S. patent application Ser. No. 13/333,337, filed Dec. 21, 2011, now U.S. Pat. No. 9,264,672, which are hereby incorporated herein by reference in their entireties. The video mirror display may comprise any suitable devices and systems and optionally may utilize aspects of the compass display systems described in U.S. Pat. Nos. 7,370,983; 7,329,013; 7,308,341; 7,289,037; 7,249,860; 7,004,593; 4,546,551; 5,699,044; 4,953,305; 5,576,687; 5,632,092; 5,677,851; 5,708,410; 5,737,226; 5,802,727; 5,878,370; 6,087,953; 6,173,508; 6,222,460; 6,513,252 and/or 6,642,851, and/or European patent application, published Oct. 11, 2000 under Publication No. EP 0 1043566, and/or U.S. Publication No. US-2006-0061008, which are all hereby incorporated herein by reference in their entireties. Optionally, the video mirror display screen or device may be operable to display images captured by a rearward viewing camera of the vehicle during a reversing maneuver of the vehicle (such as responsive to the vehicle gear actuator being placed in a reverse gear position or the like) to assist the driver in backing up the vehicle, and optionally may be operable to display the compass heading or directional heading character or icon when the vehicle is not undertaking a reversing maneuver, such as when the vehicle is being driven in a forward direction along a road (such as by utilizing aspects of the display system described in International Publication No. WO 2012/051500, which is hereby incorporated herein by reference in its entirety).

Optionally, the vision system (utilizing the forward facing camera and a rearward facing camera and other cameras disposed at the vehicle with exterior fields of view) may be part of or may provide a display of a top-down view or birds-eye view system of the vehicle or a surround view at the vehicle, such as by utilizing aspects of the vision systems described in International Publication Nos. WO 2010/099416; WO 2011/028686; WO 2012/075250; WO 2013/019795: WO 2012/075250; WO 2012/145822; WO 2013/081985; WO 2013/086249 and/or WO 2013/109869, and/or U.S. patent application Ser. No. 13/333,337, filed Dec. 21, 2011, now U.S. Pat. No. 9,264,672, which are hereby incorporated herein by reference in their entireties.

Optionally, a video mirror display may be disposed rearward of and behind the reflective element assembly and may comprise a display such as the types disclosed in U.S. Pat. Nos. 5,530,240; 6,329,925; 7,855,755; 7,626,749; 7,581,859; 7,446,650; 7,370,983; 7,338,177; 7,274,501; 7,255,451; 7,195,381; 7,184,190; 5,668,663; 5,724,187 and/or 6,690,268, and/or in U.S. Publication Nos. US-2006-0061008 and/or US-2006-0050018, which are all hereby incorporated herein by reference in their entireties. The display is viewable through the reflective element when the display is activated to display information. The display element may be any type of display element, such as a vacuum fluorescent (VF) display element, a light emitting diode (LED) display element, such as an organic light emitting diode (OLED) or an inorganic light emitting diode, an electroluminescent (EL) display element, a liquid crystal display (LCD) element, a video screen display element or backlit thin film transistor (TFT) display element or the like, and may be operable to display various information (as discrete characters, icons or the like, or in a multi-pixel manner) to the driver of the vehicle, such as passenger side inflatable restraint (PSIR) information, tire pressure status, and/or the like. The mirror assembly and/or display may utilize aspects described in U.S. Pat. Nos. 7,184,190; 7,255,451; 7,446,924 and/or 7,338,177, which are all hereby incorporated herein by reference in their entireties. The thicknesses and materials of the coatings on the substrates of the reflective element may be selected to provide a desired color or tint to the mirror reflective element, such as a blue colored reflector, such as is known in the art and such as described in U.S. Pat. Nos. 5,910,854; 6,420,036 and/or 7,274,501, which are hereby incorporated herein by reference in their entireties.

Optionally, the display or displays and any associated user inputs may be associated with various accessories or systems, such as, for example, a tire pressure monitoring system or a passenger air bag status or a garage door opening system or a telematics system or any other accessory or system of the mirror assembly or of the vehicle or of an accessory module or console of the vehicle, such as an accessory module or console of the types described in U.S. Pat. Nos. 7,289,037; 6,877,888; 6,824,281; 6,690,268; 6,672,744; 6,386,742 and/or 6,124,886, and/or U.S. Publication No. US-2006-0050018, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vehicular vision system comprising:
a forward viewing camera disposed at an in-cabin side of a windshield of a vehicle equipped with said vehicular vision system, said forward viewing camera having a field of view through the windshield and at least forward of the equipped vehicle;
a plurality of color cameras disposed at the equipped vehicle, said plurality of color cameras comprising (i) a front color camera disposed at a front portion of the equipped vehicle and having a field of view at least forward of the equipped vehicle, (ii) a driver side color camera disposed at a driver side portion of the equipped vehicle and having a field of view at least sideward of the equipped vehicle, (iii) a passenger side color camera disposed at a passenger side portion of the equipped vehicle and having a field of view at least sideward of the equipped vehicle, and (iv) a rear color camera disposed at a rear portion of the equipped vehicle and having a field of view at least rearward of the equipped vehicle;
a display device disposed in a cabin of the equipped vehicle and operable to display video images derived from image data captured by said plurality of color cameras;
a processing unit comprising a first processing chip and a second processing chip;
wherein said first processing chip comprises an image processor for machine-vision processing of image data captured by said forward viewing camera and said plurality of color cameras;
wherein said first processing chip receives image data captured by said forward viewing camera and image data captured by said plurality of color cameras;
wherein said second processing chip receives vehicle data via a vehicular communication network of the equipped vehicle and receives image data captured by said plurality of color cameras;
wherein said first processing chip controls operating parameters of said forward viewing camera;
wherein said first processing chip machine-vision processes image data captured by said forward viewing camera for object detection of objects present in the field of view of said forward viewing camera;
wherein said first processing chip machine-vision processes image data captured by said plurality of color cameras for object detection of objects present in the field of view of at least one color camera of said plurality of color cameras;
wherein said first processing chip controls operating parameters of said plurality of color cameras to enhance object detection based on machine-vision processing by said first processing chip of image data captured by said plurality of color cameras;
wherein said second processing chip does not control operating parameters of said forward viewing camera;
wherein said second processing chip controls operating parameters of said plurality of color cameras for display at said display device of video images derived from image data captured by said plurality of color cameras;
wherein said second processing chip controls operating parameters of said plurality of color cameras for machine-vision processing by said first processing chip of the image data captured by said plurality of color cameras; and
wherein, via machine-vision processing of image data captured by at least said forward viewing camera, said vehicular vision system predicts whether the equipped vehicle, when traveling on an onramp, can accelerate enough to merge with existing traffic before an end of the onramp.

2. The vehicular vision system of claim 1, wherein first frames of image data are captured with a first set of operating parameters and second frames of image data are captured with a second set of operating parameters that is different than the first set of operating parameters.

3. The vehicular vision system of claim 2, wherein the first frames of captured image data alternate with the second frames of captured image data.

4. The vehicular vision system of claim 2, wherein the first set of operating parameters provide enhanced display at said display device of video images derived from the first frames of image data captured by said plurality of color cameras.

5. The vehicular vision system of claim 2, wherein the second set of operating parameters provide enhanced object detection based on machine-vision processing by said first processing chip of the second frames of image data captured by said plurality of color cameras.

6. The vehicular vision system of claim 1, wherein said first processing chip has three camera input channels, said three camera input channels comprising (i) a first channel for receiving image data captured by said forward viewing camera, (ii) a second channel for receiving image data captured by said front color camera and said rear color camera, and (iii) a third channel for receiving image data captured by said driver side color camera and said passenger side color camera.

7. The vehicular vision system of claim 1, wherein said plurality of color cameras comprise fisheye cameras.

8. The vehicular vision system of claim 1, wherein said plurality of color cameras capture image data at a frame rate of at least 30 frames per second.

9. The vehicular vision system of claim 1, wherein said second processing chip receives the vehicle data via a CAN network of the equipped vehicle.

10. The vehicular vision system of claim 1, wherein said plurality of color cameras is part of a multi-camera surround view system of the equipped vehicle, and wherein video images displayed at said display device comprise a bird's eye view at least partially surrounding the equipped vehicle.

11. The vehicular vision system of claim 1, wherein said forward viewing camera comprises an imager having a two dimensional array of a plurality of photosensor elements arranged in at least 640 columns and 480 rows, and wherein each camera of said plurality of color cameras comprises an imager having a two dimensional array of a plurality of photosensor elements arranged in at least 640 columns and 480 rows.

12. The vehicular vision system of claim 11, wherein said two dimensional array comprises at least one million photosensor elements.

13. The vehicular vision system of claim 1, wherein said first processing chip processes image data captured by said forward viewing camera for at least three selected from the group consisting of (i) an adaptive cruise control system of the equipped vehicle, (ii) a traffic jam assist system of the equipped vehicle, (iii) an automatic emergency braking system of the equipped vehicle, (iv) a lane keep assist system of the equipped vehicle, (v) a lane departure warning system of the equipped vehicle, (vi) a traffic sign recognition system of the equipped vehicle and (vii) a pedestrian detection system of the equipped vehicle.

14. A vehicular vision system comprising:
a forward viewing camera disposed at an in-cabin side of a windshield of a vehicle equipped with said vehicular vision system, said forward viewing camera having a field of view through the windshield and at least forward of the equipped vehicle;
a plurality of color cameras disposed at the equipped vehicle, said plurality of color cameras comprising (i) a front color camera disposed at a front portion of the equipped vehicle and having a field of view at least forward of the equipped vehicle, (ii) a driver side color camera disposed at a driver side portion of the equipped vehicle and having a field of view at least sideward of the equipped vehicle, (iii) a passenger side color camera disposed at a passenger side portion of the equipped vehicle and having a field of view at least sideward of the equipped vehicle, and (iv) a rear color camera disposed at a rear portion of the equipped vehicle and having a field of view at least rearward of the equipped vehicle;
a display device disposed in a cabin of the equipped vehicle and operable to display video images derived from image data captured by said plurality of color cameras;
a processing unit comprising a first processing chip and a second processing chip;
wherein said first processing chip comprises an image processor for machine-vision processing of image data captured by said forward viewing camera and said plurality of color cameras;
wherein said first processing chip receives image data captured by said forward viewing camera and image data captured by said plurality of color cameras;
wherein said first processing chip has three camera input channels, said three camera input channels comprising (i) a first channel for receiving image data captured by said forward viewing camera, (ii) a second channel for receiving image data captured by said front color camera and said rear color camera, and (iii) a third channel for receiving image data captured by said driver side color camera and said passenger side color camera;
wherein said second processing chip receives vehicle data via a vehicular communication network of the equipped vehicle and receives image data captured by said plurality of color cameras;
wherein said first processing chip controls operating parameters of said forward viewing camera;
wherein said first processing chip machine-vision processes image data captured by said forward viewing camera for object detection of objects present in the field of view of said forward viewing camera;
wherein said first processing chip machine-vision processes image data captured by said plurality of color cameras for object detection of objects present in the field of view of at least one color camera of said plurality of color cameras;
wherein said first processing chip controls operating parameters of said plurality of color cameras to enhance object detection based on machine-vision processing by said first processing chip of image data captured by said plurality of color cameras;
wherein said second processing chip does not control operating parameters of said forward viewing camera;
wherein said second processing chip controls operating parameters of said plurality of color cameras when capturing first frames of image data for display at said display device of video images derived from the first frames of image data captured by said plurality of color cameras;
wherein the first frames of image data are captured with a first set of operating parameters;
wherein said second processing chip controls operating parameters of said plurality of color cameras when capturing second frames of image data for machine-vision processing by said first processing chip of the second frames of image data captured by said plurality of color cameras;
wherein the second frames of image data are captured with a second set of operating parameters that is different than the first set of operating parameters; and
wherein, via machine-vision processing of image data captured by at least said forward viewing camera, said vehicular vision system predicts whether the equipped vehicle, when traveling on an onramp, can accelerate enough to merge with existing traffic before an end of the onramp.

15. The vehicular vision system of claim 14, wherein the first frames of captured image data alternate with the second frames of captured image data.

16. The vehicular vision system of claim 14, wherein said plurality of color cameras captures image data at a frame rate of at least 30 frames per second.

17. The vehicular vision system of claim 14, wherein said forward viewing camera comprises an imager having a two dimensional array of a plurality of photosensor elements arranged in at least 640 columns and 480 rows, and wherein each camera of said plurality of color cameras comprises an imager having a two dimensional array of a plurality of photosensor elements arranged in at least 640 columns and 480 rows, and wherein said two dimensional arrays each comprise at least one million photosensor elements.

18. The vehicular vision system of claim 17, wherein said first processing chip processes image data captured by said forward viewing camera for at least three selected from the group consisting of (i) an adaptive cruise control system of the equipped vehicle, (ii) a traffic jam assist system of the equipped vehicle, (iii) an automatic emergency braking system of the equipped vehicle, (iv) a lane keep assist system of the equipped vehicle, (v) a lane departure warning system of the equipped vehicle, (vi) a traffic sign recognition system of the equipped vehicle and (vii) a pedestrian detection system of the equipped vehicle.

19. A vehicular vision system comprising:
a forward viewing camera disposed at an in-cabin side of a windshield of a vehicle equipped with said vehicular vision system, said forward viewing camera having a field of view through the windshield and at least forward of the equipped vehicle;
a plurality of color cameras disposed at the equipped vehicle, said plurality of color cameras comprising (i) a front color camera disposed at a front portion of the equipped vehicle and having a field of view at least forward of the equipped vehicle, (ii) a driver side color camera disposed at a driver side portion of the equipped vehicle and having a field of view at least sideward of the equipped vehicle, (iii) a passenger side color camera disposed at a passenger side portion of the equipped vehicle and having a field of view at least sideward of the equipped vehicle, and (iv) a rear color camera disposed at a rear portion of the equipped vehicle and having a field of view at least rearward of the equipped vehicle;
a display device disposed in a cabin of the equipped vehicle and operable to display video images derived from image data captured by said plurality of color cameras;
wherein said plurality of color cameras are part of a multi-camera surround view system of the equipped vehicle, and wherein video images derived from the image data captured by said plurality of color cameras and displayed at said display device comprise a bird's eye view at least partially surrounding the equipped vehicle;
a processing unit comprising a first processing chip and a second processing chip;
wherein said first processing chip comprises an image processor for machine-vision processing of image data captured by said forward viewing camera and said plurality of color cameras;
wherein said first processing chip receives image data captured by said forward viewing camera and image data captured by said plurality of color cameras;
wherein said second processing chip receives vehicle data via a vehicular communication network of the equipped vehicle and receives image data captured by said plurality of color cameras;
wherein said first processing chip controls operating parameters of said forward viewing camera;
wherein said first processing chip machine-vision processes image data captured by said forward viewing camera for object detection of objects present in the field of view of said forward viewing camera;
wherein said first processing chip machine-vision processes image data captured by said plurality of color cameras for object detection of objects present in the field of view of at least one color camera of said plurality of color cameras;
wherein said first processing chip controls operating parameters of said plurality of color cameras to enhance object detection based on machine-vision processing by said first processing chip of image data captured by said plurality of color cameras;
wherein said second processing chip controls operating parameters of said plurality of color cameras for display at said display device of video images derived from image data captured by said plurality of color cameras;
wherein said second processing chip controls operating parameters of said plurality of color cameras for machine-vision processing by said first processing chip of the image data captured by said plurality of color cameras;
wherein first frames of image data are captured with a first set of operating parameters and second frames of image data are captured with a second set of operating parameters that is different than the first set of operating parameters; and
wherein, via machine-vision processing of image data captured by at least said forward viewing camera, said vehicular vision system predicts whether the equipped vehicle, when traveling on an onramp, can accelerate enough to merge with existing traffic before an end of the onramp.

20. The vehicular vision system of claim 19, wherein the first frames of captured image data alternate with the second frames of captured image data.

21. The vehicular vision system of claim 19, wherein the first set of operating parameters provide enhanced display at said display device of video images derived from the first frames of image data captured by said plurality of color cameras.

22. The vehicular vision system of claim 19, wherein the second set of operating parameters provide enhanced object detection based on machine-vision processing by said first processing chip of the second frames of image data captured by said plurality of color cameras.

23. The vehicular vision system of claim 19, wherein said first processing chip has three camera input channels, said three camera input channels comprising (i) a first channel for receiving image data captured by said forward viewing camera, (ii) a second channel for receiving image data captured by said front color camera and said rear color camera, and (iii) a third channel for receiving image data captured by said driver side color camera and said passenger side color camera.

\* \* \* \* \*